United States Patent
Zamat (12) 
(10) Patent No.: US 6,456,257 B1
(45) Date of Patent: Sep. 24, 2002

(54) SYSTEM AND METHOD FOR SWITCHING BETWEEN DIFFERENT ANTENNA PATTERNS TO SATISFY ANTENNA GAIN REQUIREMENTS OVER A DESIRED COVERAGE ANGLE

(75) Inventor: Hassan Zamat, San Diego, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/742,175

(22) Filed: Dec. 21, 2000

(51) Int. Cl.[7] ................................. H01Q 3/24
(52) U.S. Cl. ..................... 343/876; 343/853; 343/895
(58) Field of Search ................. 343/895, 853, 343/876; 455/82, 284; H01Q 3/24

(56) References Cited

U.S. PATENT DOCUMENTS

| | | | |
|---|---|---|---|
| 5,722,089 A | * 2/1998 | Murakami | 343/702 |
| 5,909,196 A | * 6/1999 | O'neill, Jr. | 343/895 |
| 6,204,827 B1 | * 3/2001 | Endo et al. | 343/895 |
| 6,229,486 B1 | * 5/2001 | Krile | 343/700 MS |
| 6,278,415 B1 | * 8/2001 | Matsuyoshi et al. | 343/895 |
| 6,344,833 B1 | * 2/2002 | Lin et al. | 343/846 |

* cited by examiner

Primary Examiner—Hoanganh Le
(74) Attorney, Agent, or Firm—John T. Whelan; Michael W. Sales (57) ABSTRACT

A system and method for controlling an antenna arrangement including a plurality of antennas employed in, for example, a user terminal of a communications network, to provide a selected antenna pattern from among different antenna patterns based on, for example, the strength of a communications signal being received by the antenna arrangement of the user terminal, in order to satisfy desired gain and beamwidth requirements. The system and method can employ a switch that can be manually switched to control the antenna arrangement to provide the selected antenna pattern. The switch also can include a plurality of diodes that are controlled automatically or by a manual switch to select the antenna pattern. The plurality of antennas can be selectively activated and deactivated to provide the selected antenna pattern. Also, the plurality of antennas can be stacked vertically in relation to each other, or can include a first antenna and a second antenna disposed within said first antenna. Furthermore, the antenna arrangement can include at least one quadrifilar antenna or at least one octifilar antenna.

21 Claims, 6 Drawing Sheets

SYSTEM AND METHOD FOR SWITCHING BETWEEN DIFFERENT ANTENNA PATTERNS TO SATISFY ANTENNA GAIN REQUIREMENTS OVER A DESIRED COVERAGE ANGLE

BACKGROUND OF THE INVENTION

1. Field of the Invention

The present invention relates to a system and method for switching between different antenna patterns to satisfy antenna gain requirements over a desired coverage angle. More particularly, the present invention relates to a system and method for switching between different antenna patterns used by a user terminal of a communications network based on the strength of a communications signal being received by the antenna of the user terminal, in order to satisfy desired gain and beamwidth requirements.

2. Description of the Related Art

A satellite-based communications network includes a plurality of user terminals which transmit and receive communications signals to and from, for example, a base station or other user terminals via one or more satellites, which can be low earth orbit (LEO) satellites, geosynchronous earth orbit (GEO) satellites, or a combination of both. Each user terminal includes an antenna that provides an antenna pattern which is suitable for transmitting and receiving the communications signals, which are typically radio frequency (RF) signals.

The types of antennas employed in user terminals generally provide a compromise between the antenna beamwidth and antenna gain. That is, as the antenna beamwidth broadens, the gain over the beamwidth drops. Therefore, certain antenna gain-to-noise temperature requirements (G/T) and beamwidth requirements are difficult to achieve with a conventional antenna.

For example, one network specification requires that the antenna gain should be 2 dBic over 75% of the solid angle. Assuming that the antenna beam is spherical, 75% of the solid angle translates into an angle of 150 degrees. This means that the gain of the antenna, which is assumed to be fixed, would need to be at least 2 dB over an angle of ±75 degrees from Zenith (or for elevation above 15 degrees). However, a current engineering model indicates that a gain of 2 dB can be sustained over an angle of only ±51 degrees (102 degrees total), which provides a beamwidth almost ⅓ narrower than the required beamwidth specification of 150 degrees. Furthermore, the G/T specification in this network is very stringent. Assuming a 2 dB antenna gain, the required noise figure of the receiver would need to be 2.36 dB for the entire receiver, which is impractical to achieve for high volume production of low cost mobile telephones. In order to achieve the required noise figure, it would be necessary to increase the gain of the antenna over the entire 150 angle, which cannot be achieved with a conventional fixed (non-swivel) antenna. It is noted that factors such as the restriction in size of the mechanical housing of the user terminal, electrical considerations such as losses, leakage and coupling, and power to the antenna, as well as economical considerations, can adversely affect the ability to increase antenna gain.

In an attempt to solve the above problems associated with fixed antennas, a user terminal can be modified to employ a swivel antenna to provide the required gain over the desired beamwidth. However, it is impractical to use a swivel antenna in a user terminal for a satellite-based communications networks employing satellites that are not geosynchronous. In such networks, the user terminal would continuously need to adjust the direction in which the antenna is pointing, because the satellites move with respect to the earth's surface. This process becomes more complicated if the user terminal needs to simultaneously track two satellites orbiting the earth at two different elevations, especially if the user terminal is in a moving vehicle.

Accordingly, a need exists for an antenna that can be employed in a user terminal of a satellite-based communications network to provide enhanced gain and beamwidth features.

SUMMARY OF THE INVENTION

An object of the present invention is to provide an antenna arrangement that can be employed in a user terminal of a satellite-based communications network to provide enhanced gain and beamwidth features.

Another object of the invention is to provide an antenna arrangement, for use in a user terminal of a satellite-based communications network, that is capable of providing a stable, optimum gain over a wide coverage angle.

A further object of the invention it to provide a system and method that uses a single antenna configuration that can be controlled to provide different antenna patterns to satisfy antenna gain requirements over a desired coverage angle.

These and other objects are substantially achieved by providing a system and method for controlling an antenna arrangement comprising a plurality of antennas employed in, for example, a user terminal of a communications network, to provide a selected antenna pattern from among different antenna patterns based on, for example, the strength of a communications signal being received by the antenna arrangement of the user terminal, in order to satisfy desired gain and beamwidth requirements. The system and method can employ a switch that can be, for example, manually switched, or switched by a user controllable switch or automated arbitration process, to control the antenna arrangement to provide the selected antenna pattern. The switch also can include a plurality of diodes that are controlled automatically or, for example, by a user controllable switch or automated arbitration process, to select the antenna pattern. The plurality of antennas can be selectively activated and deactivated to provide the selected antenna pattern. Also, the plurality of antennas can be stacked vertically in relation to each other, or can include a first antenna and a second antenna disposed within said first antenna. Furthermore, the antenna arrangement can include at least one quadrifilar antenna or at least one octifilar antenna.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
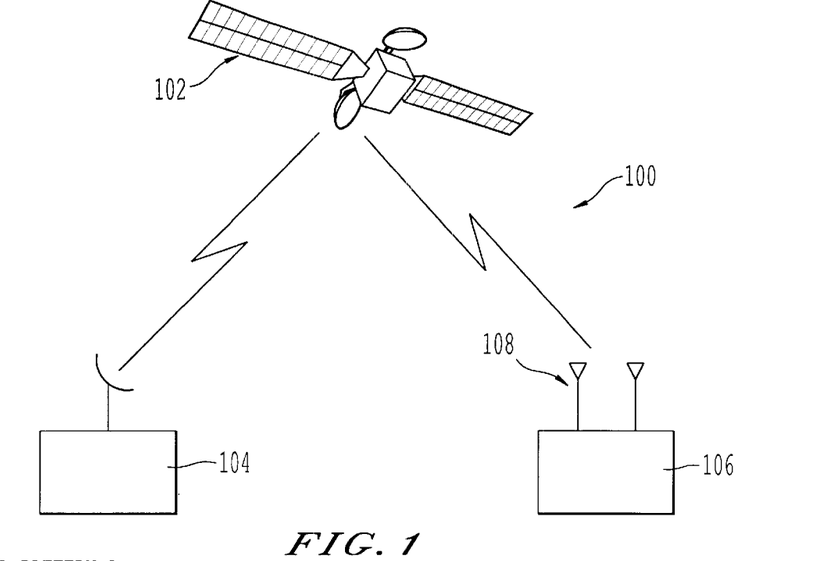
FIG. 1 is a conceptual block diagram of a satellite-based communications network including a user terminal employing a system and method according to an embodiment of the present invention.

FIG. 1 illustrates an example of a satellite-based communications network 100 including a satellite 102, such as a non-geosynchronous earth orbit satellite, at least one base station 104, and at least one user terminal 106 including an antenna arrangement 108 as described in more detail below. As can be appreciated by one skilled in the art, the user terminals 106 are capable of transmitting and receiving communication signals, such as RF time-division multiple access (TDMA) or code-division multiple access (CDMA) signals, to communicate with the base station 104 and each other 106 via satellite 102.

Figure 2:
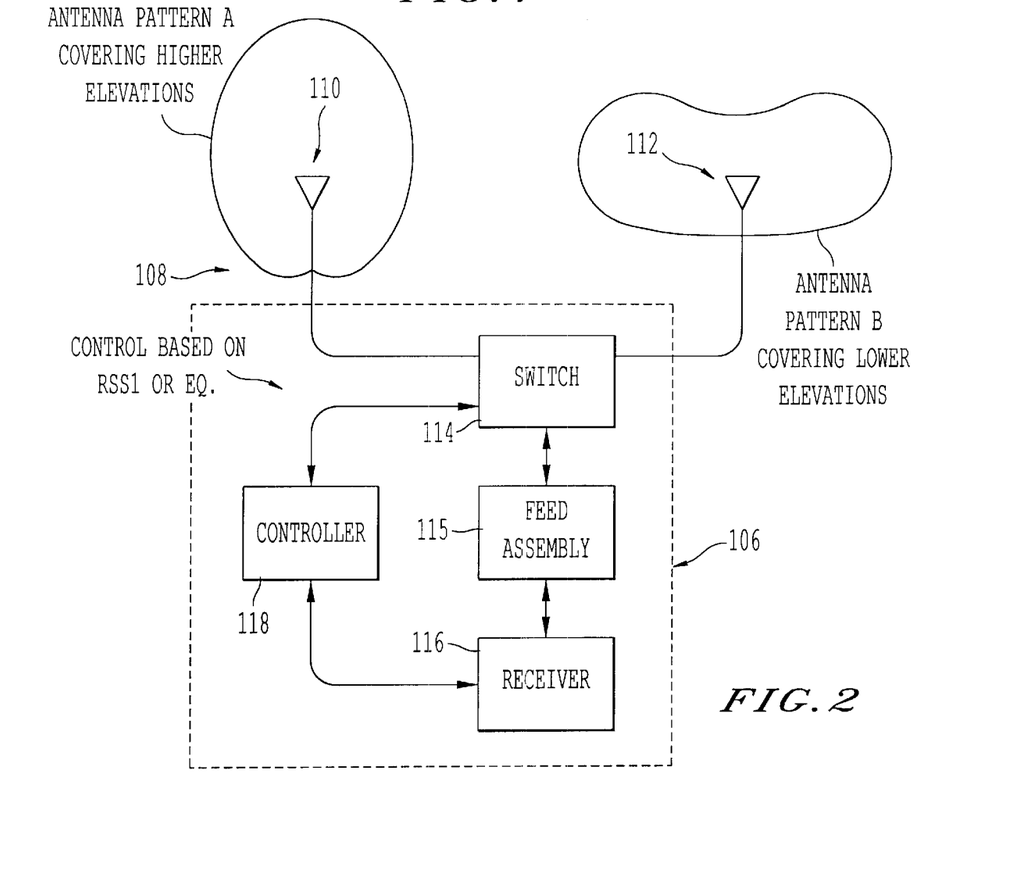
FIG. 2 is a block diagram illustrating an example of a user terminal shown in FIG. 1 employing an antenna arrangement, as well as a system and method for controlling the antenna arrangement, according to an embodiment of the present invention.
Figure 3:
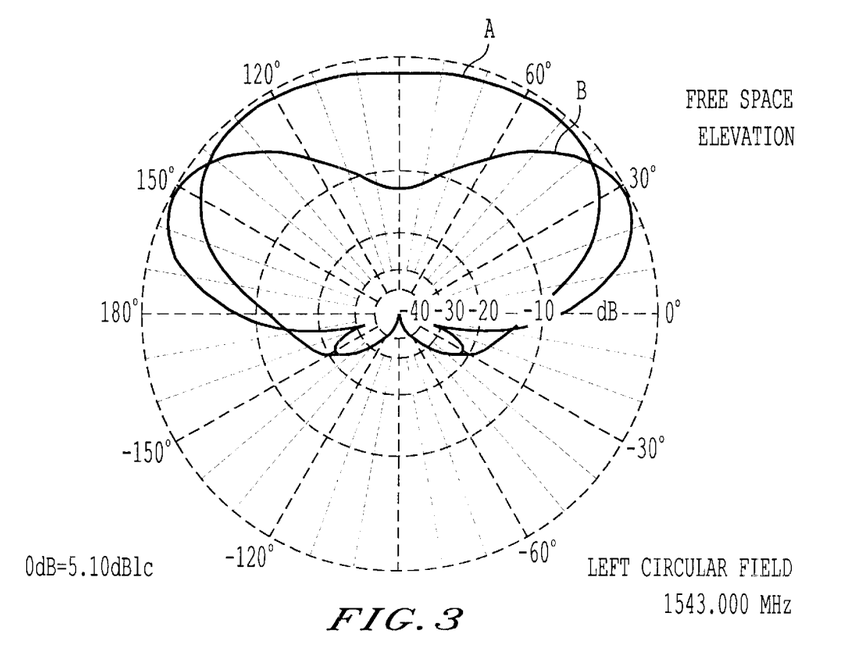
FIG. 3 is an example of an antenna pattern chart illustrating exemplary antenna patterns provided by the antenna arrangement shown in FIG. 2.
Figure 4:
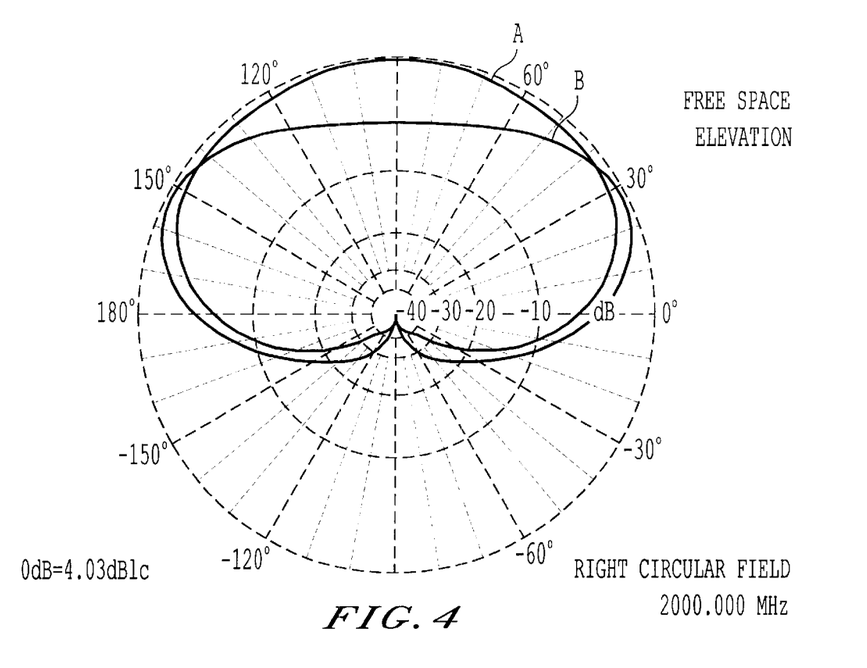
FIG. 4 is another example of an antenna pattern chart illustrating additional exemplary antenna patterns provided by the antenna arrangement shown in FIG. 2.
Figure 5:
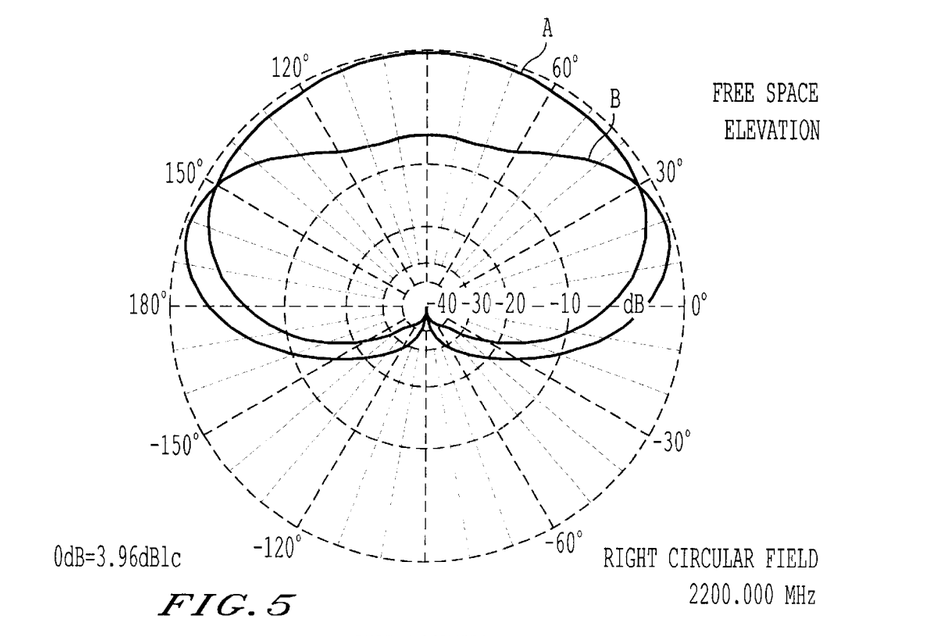
FIG. 5 is a further example of an antenna pattern chart illustrating additional exemplary antenna patterns provided by the antenna arrangement shown in FIG. 2.

As shown in more detail in FIG. 2, the antenna arrangement 108 of a user terminal 106 in this example includes two antennas 110 and 112, which are arranged as separate antennas that are each coupled to a switch 114. Antennas 110 and 112 can be quadrifilar antennas, and provide respective antenna patterns A and B as shown, for example, in the graph of FIG. 3. The antenna patterns A and B as shown in FIG. 3 are provided by antennas 110 and 112, respectively, at 1543 MHz, as indicated. Examples of antenna patterns A and B at 2000 MHz and 2200 MHz are shown in the graphs of FIGS. 4 and 5, respectively.

Figure 6:
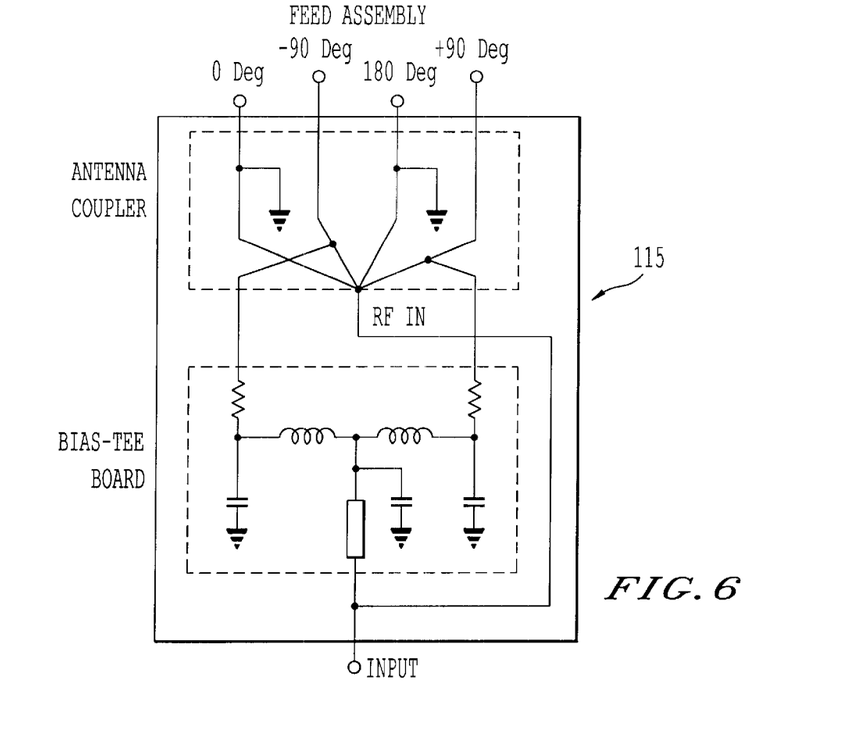
FIG. 6 is a block diagram illustrating an example of components of the feed assembly included in the user terminal shown in FIG. 2 according to an embodiment of the present invention.
Figure 7:
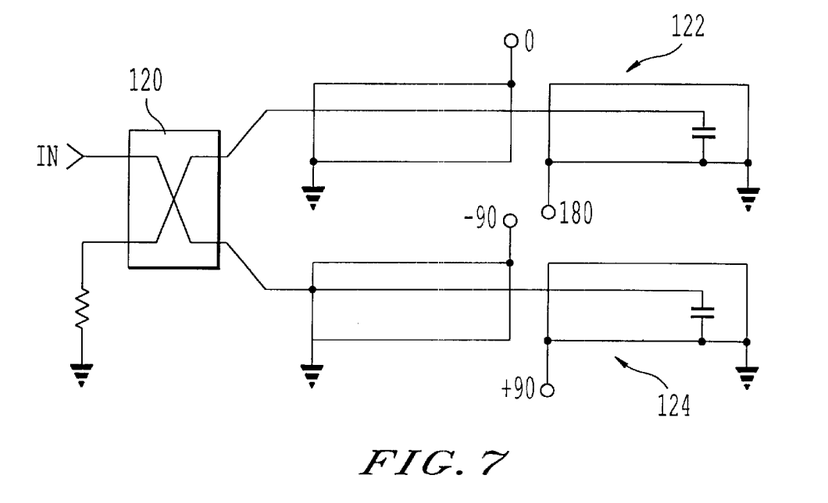
FIG. 7 is a block diagram illustrating an alternate example of components of the antenna coupler included in the feed assembly shown in FIG. 6 according to an embodiment of the present invention.
Figure 8:
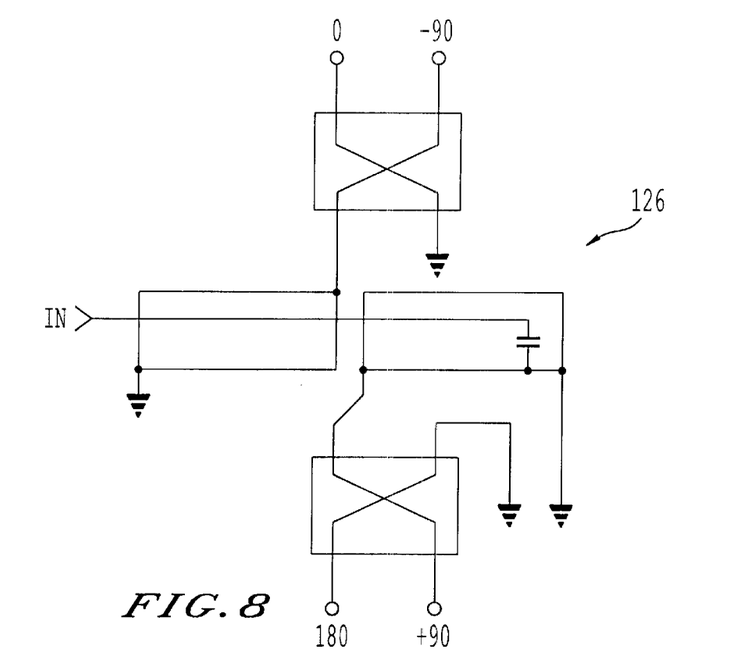
FIG. 8 is a block diagram illustrating another alternate example of components of the antenna coupler included in the feed assembly shown in FIG. 6 according to an embodiment of the present invention.

The user terminal 106 further includes, among other things, a feed assembly 115, a receiver 116 and a controller 118. The receiver 116 is coupled to the feed assembly 115, which is coupled to the switch 114. As shown in FIG. 6, feed assembly 115 can include an antenna coupler and bias-tee board. Alternatively, the antenna coupler of the feed assembly 115 can include a 90° stripline broadside coupled hybrid 120 feeding two stripline Marchand baluns 122 and 124 as shown in FIG. 7. As another alternative, the antenna coupler of feed assembly 115 can include a single Marchand balun 126 which receives the input signal from controller 118, and two 90° stripline broadside coupled hybrids 128 and 130 as the antenna feeds, as shown in FIG. 8.

Figure 9:
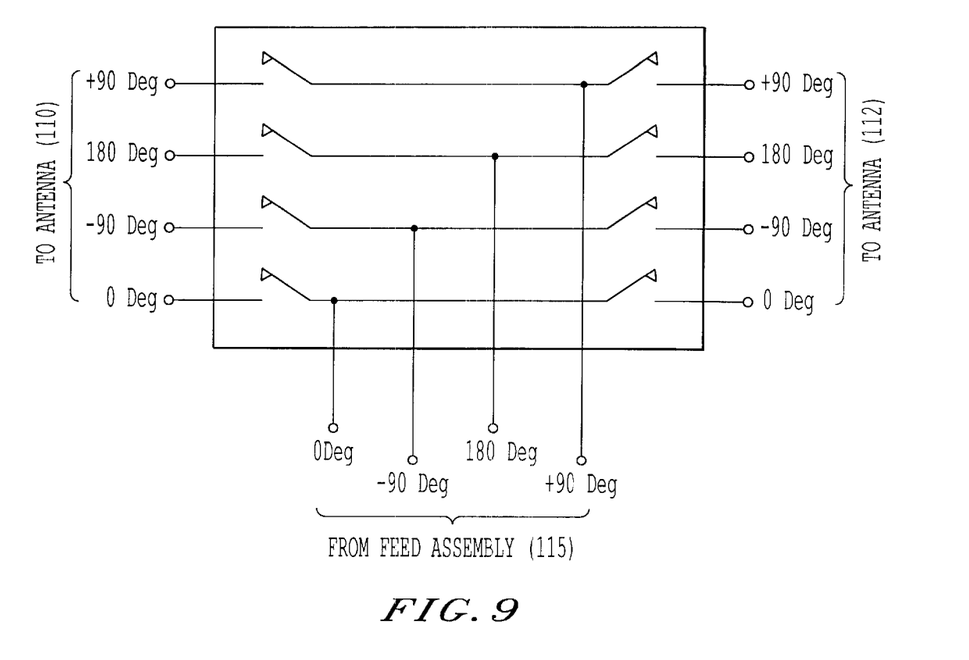
FIG. 9 is a block diagram illustrating an example of the switching assembly shown in FIG. 2 according to an embodiment of the present invention.

Under the control of controller 118, the switch 114 provides to the receiver 116 transmission signals received by the antenna arrangement 108. The receiver 116 provides a sample of the received signals to the controller 118, so that the controller 118 can determine whether antenna pattern A or B is most suitable for receiving the received signal. Specifically, as will now be described, the controller 118 includes a microcontroller circuit that controls the switch 114 to select one of the two antennas 110 and 112 for signal reception based on the strength of the received signal. The switch 114 can be an electrical switch as shown in FIG. 9, for example, which can be controlled to electrically couple antenna 110 or antenna 112 to receiver 116, as appropriate, to provide the desired antenna pattern.

During operation, the microcontroller circuit of controller 118 compares the respective received signal strength indicators (RSSI) associated with the signals received at the respective antennas 110 and 112, and controls the switch 114 to select for signal reception the antenna having the higher RSSI value. The microcontroller circuit can also have access to information pertaining to the location of the satellite 102 from which the user terminal 106 is to receive transmission signals, and use this information to control the switch 114 to select one of the antennas 110 and 112 that provides a more favorable antenna pattern for receiving the signals.

For example, if the microcontroller circuit determines that antenna pattern A provided by antenna 110 enables the signal from satellite 102 to be received at a signal strength higher than it would be received by antenna 112, the microcontroller circuit controls switch 114 to select antenna 110 for signal reception. In this example, switch 114 therefore electrically couples antenna 110 to receiver 116 to enable receiver 116 to receive the signals received at antenna 110. Switch 114 also electrically uncouples antenna 112 from receiver 116 so that no signals are provided to receiver 116 from antenna 112. On the other hand, if the microcontroller circuit determines that antenna pattern B provided by antenna 112 enables the signal from satellite 102 to be received at a signal strength higher than it would be received by antenna 110, the microcontroller circuit controls switch 114 to select antenna 112 for signal reception. In this example, switch 114 therefore electrically couples antenna 112 to receiver 116 to enable receiver 116 to receive the signals received at antenna 112. Switch 114 also electrically uncouples antenna 110 from receiver 116 so that no signals are provided to receiver 116 from antenna 110.

In the example discussed above, antennas 110 and 112 are quadrifilar antennas arranged as separate antennas, and only one of the antennas 110 and 112 is selected for signal reception. However, the user terminal 106 can employ other types of antenna configurations as will now be discussed.

Figure 10:
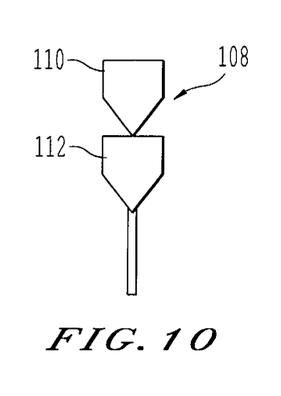
FIG. 10 is a block diagram illustrating an example of the switching assembly shown in FIG. 2, along with an alternative antenna arrangement that can be employed in the user terminal, according to an embodiment of the present invention.

As shown in FIG. 10, for example, the antenna arrangement 108 can be configured with the two antennas 110 and 112 in a stacked arrangement to provide a sum-difference antenna. As can be appreciated by one skilled in the art, in this type of antenna arrangement, the sum of antenna patterns A and B provided by antennas 110 and 112, respectively, creates one antenna pattern, while the difference between antenna patterns A and B creates another antenna pattern. In this arrangement, switch 114 is modified to select antennas 110 and 112 in such a way to add their antenna patterns (e.g., A+B) or subtract their antenna patterns (e.g., A−B, or B−A), as desired, to provide the appropriate resultant antenna pattern that achieves the highest received signal strength. In addition, as with the example described above, switch 114 can be configured to select either antenna 110 or antenna 112, without the other, so as to allow reception of the signal with only antenna pattern A or only antenna pattern B.

Figure 11:
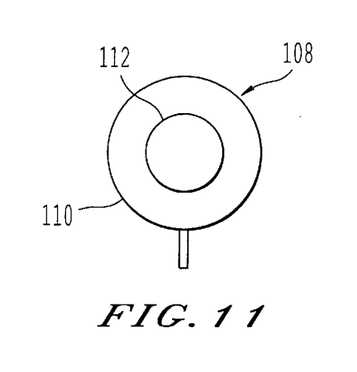
FIG. 11 is a block diagram illustrating an example of another alternative antenna arrangement according to an embodiment of the present invention that can be employed in the user terminal shown in FIG. 2.

As shown in FIG. 11, the antenna arrangement 108 can be configured with antenna 112 inside antenna 110, or vice versa. In this example, switch 114 can be modified to select antennas 110 and 112 to provide the sum-difference characteristics described above with regard to the arrangement shown in FIG. 11. Switch 114 can also be configured to select either antenna 110 or antenna 112 as described above.

As discussed above, either or both antennas 110 and 112 can be constructed as an octifilar antenna having eight elements. Antennas 110 and 112 can alternatively be constructed as two quadrifilar antennas physically rotated by 45 degrees.

Figure 12:
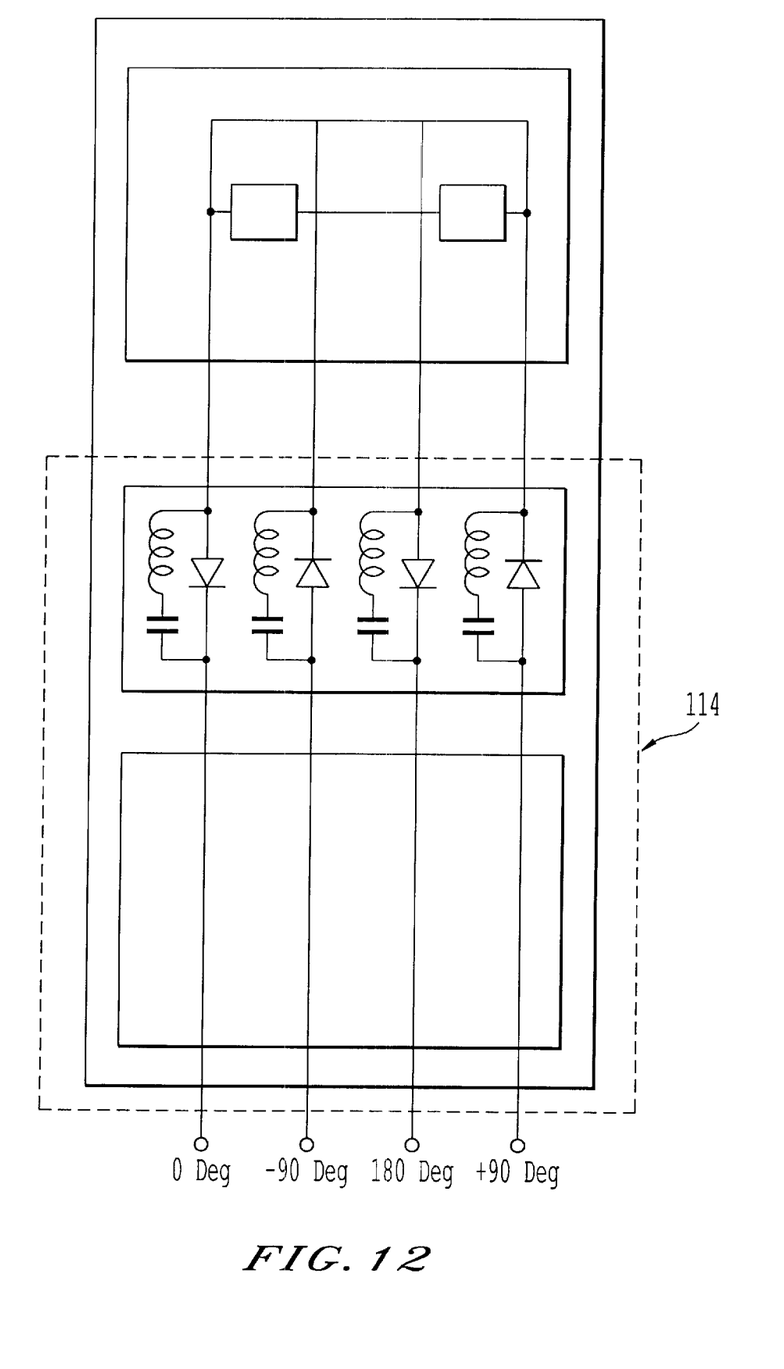
FIG. 12 is a block diagram illustrating an example of a further alternative antenna arrangement according to an embodiment of the present invention that can be employed in the user terminal shown in FIG. 2.

Furthermore, instead of the antenna arrangement 108 having two antennas 110 and 112, antenna arrangement 108 can be configured as a single quadrifilar antenna having helical elements, as shown in FIG. 12. In this example, switch 114 is configured to include pin diodes that are coupled to the helical elements of the antenna, which are represented by the two square boxes coupled to the pin diodes. The controller 118 can control the on and off states of the pin diodes to vary the electrical lengths of the helical elements of the quadrifilar antenna in order to distort or generate different antenna patterns, as appropriate, to provide the antenna pattern that enables the signal from satellite 102 to be received at the highest signal strength.

It is noted that the configurations of switch 114 described above provide an electronic switch that is automatically controlled by controller 118. However, any of the configurations of switch 114 discussed above can be embodied in a mechanical switch that enables a user to manually chose between antenna patterns. Also, the electronic switch configuration can include a manual override which enables a user to select an antenna pattern other than that selected by controller 118.

As can be appreciated from the above description, a gain of 2 dB over a broad beamwidth can be achievable by electrically or mechanically switching between two antenna patterns. It is also possible to increase the number of switchable patterns in order to meet higher gain requirements over the beamwidth. For example, four different patterns with different weighing on 2 physical antennas: 10, 11 (sum pattern), 01,00 (difference pattern). If a higher gain is achieved over the beamwidth, then a less stringent receiver can be designed.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. An antenna system for use with a communications network, comprising:
   first and second antennas, adapted to provide first and second antenna patterns, respectively which differ from each other; and
   a switch, adapted to control said first and second antennas to provide one of said first and second antenna patterns as a selected antenna pattern based on a characteristic of a signal received by said antenna system from a transmitting source of said communications network so that said first and second antennas are adapted to use said selected antenna pattern to receive a signal.

2. The antenna system as claimed in claim 1, wherein:
   said switch is adapted to automatically control said first and second antennas to provide said selected antenna pattern based on said characteristic.

3. The antenna system as claimed in claim 1, wherein:
   said switch is adapted to control said first and second antennas to provide said selected antenna pattern based on said characteristic which includes a received strength of said signal.

4. The antenna system as claimed in claim 1, wherein:
   said switch is adapted for user controllable switching to control said first and second antennas to provide said selected antenna pattern.

5. The antenna system as claimed in claim 1, wherein:
   each of said first and second antenna patterns provides different antenna gains.

6. The antenna system as claimed in claim 5, wherein:
   said switch is adapted to control said first and second antennas to activate one of said antennas to provide said selected antenna pattern.

7. The antenna system as claimed in claim 1, wherein:
   said switch is adapted to activate one of said first and second antennas to provide said selected antenna pattern while deactivating the other of said first and second antennas.

8. The antenna system as claimed in claim 1, wherein:
   said switch is adapted to selectively activate said first and second antennas to operate in a first mode to provide said first antenna pattern as said selected antenna pattern and in a second mode to provide said second antenna pattern as said selected antenna pattern.

9. The antenna system as claimed in claim 1, wherein:
   said first and second antennas are stacked vertically in relation to each other.

10. The antenna system as claimed in claim 1, wherein:
    said first and second antennas include a first antenna element and a second antenna element disposed within said first antenna.

11. The antenna system as claimed in claim 1, wherein:
    at least one of said first and second antennas provides a quadrifilar pattern.

12. The antenna system as claimed in claim 1, wherein:
    at least one of said first and second antennas provides an octifilar pattern.

13. The antenna system as claimed in claim 1, wherein:
    said switch includes at least one diode; and
    said antenna system includes a controller which is adapted to control said at least one diode to provide said selected antenna pattern.

14. A method for controlling first and second antennas of a receiver of a communications network, said first and second antennas being adapted to selectively provide first and second antenna patterns which differ from each other, the method comprising the steps of:
    controlling said first and second antennas to provide one of said first and second antenna patterns as a selected antenna pattern based on a characteristic of a signal received by first and second antennas from a transmitting source of said communications network; and controlling said receiver to use said selected antenna pattern to receive a communications signal.

15. The method as claimed in claim 14, wherein:

said first and second antennas controlling step automatically controls said first and second antennas to provide said selected antenna pattern based on said characteristic.

16. The method as claimed in claim 14, wherein:

said first and second antennas controlling step controls said first and second antennas to provide said selected antenna pattern based on said characteristic which includes a received strength of said signal.

17. The method as claimed in claim 14, wherein:

said first and second antennas controlling step includes the step of manually switching a switch to control said first and second antennas to provide said selected antenna pattern.

18. The method as claimed in claim 14, wherein:

said first and second antennas controlling step controls said first and second antennas to activate one of said antennas to provide said selected antenna pattern.

19. The method as claimed in claim 14, wherein:

said first and second antennas controlling step activates one of said first and second antennas to provide said selected antenna pattern while deactivating the other of said first and second antennas.

20. The method as claimed in claim 14, wherein:

said first and second antennas controlling step includes the step of selectively activating said first and second antenna antennas to operate in a first mode to provide said first antenna pattern as said selected antenna pattern and in a second mode to provide said second antenna pattern as said selected antenna pattern.

21. The method as claimed in claim 14, wherein:

said receiver includes a switch comprising at least one diode; and said first and second antennas controlling step controls said at least one diode to provide said selected antenna pattern.

* * * * *